United States Patent [19]

Negishi

[11] Patent Number: 4,897,675
[45] Date of Patent: Jan. 30, 1990

[54] PRINTER

[75] Inventor: Kiyoshi Negishi, Saitama, Japan

[73] Assignee: Asahi Kogaku Kogyo K.K., Tokyo, Japan

[21] Appl. No.: 342,874

[22] Filed: Apr. 25, 1989

[30] Foreign Application Priority Data

Apr. 27, 1988 [JP] Japan .............................. 63-56933[U]

[51] Int. Cl.⁴ ............................................. G01D 15/00
[52] U.S. Cl. ...................................... 346/154; 346/160
[58] Field of Search ........... 346/150, 154, 160, 107 R, 346/108, 153.1; 358/300, 302; 355/8

[56] References Cited

U.S. PATENT DOCUMENTS 4,761,662  8/1988  Yoshimoto et al. ................. 346/160
4,768,043  8/1988  Saito et al. ........................... 346/160

Primary Examiner—Arthur G. Evans
Attorney, Agent, or Firm—Sandler & Greenblum

[57] ABSTRACT

In a printer, a guide mechanism guides opposite side edges of the recording medium to enable the recording medium to travel along a predetermined path. The guide mechanism is movable widthwise of the recording medium in accordance with a width of the recording medium. A position detector is interlocked with the guide mechanism for detecting a position of the guide mechanism widthwise of the recording medium to generate a position signal representative of the position of the guide mechanism. A controller is operative in response to the position signal from the position detector, for delaying timing, widthwise of the recording medium, at which the image information is recorded onto the recording medium, thereby regulating a printing start-up position on the recording medium.

8 Claims, 3 Drawing Sheets

PRINTER

BACKGROUND OF THE INVENTION

This invention relates to a printer for printing image information onto a recording medium and, more particularly, to a system for regulating a widthwise printing start-up position on the recording medium in accordance with a width thereof.

Conventinally, there is known an image recording apparatus utilizing a so-called electrophotographic system in which a charged surface of a photoconductive drum is exposed to light to form a latent image on the charged drum surface. Toner is then applied to the latent image to develop the image, and the developed image is transferred onto a recording medium and fixed by a fixing unit. Such an image recording apparatus is chiefly employed in a copying machine. In recent years, however, the image recording apparatus is also being utilized printer and the like for printing out information outputted from a computer. Further, in the copying machine, cut sheets are generally used as the recording medium. In a printer, however, it is desired to use, as the recording medium, a continuous recording form that is identical with that used conventionally in a line-printer or the like.

The continuous recording form is a folded continuous recording form (hereinafter referred to simply as "continuous form") called a fan-folded form, which is folded into a predetermined length and which has sprocket holes formed in opposite side edge portions of the fan-folded form. Perforations are provided at each of the folded sections to enable the sheet sections be easily severed from each other. In this connection, there are several types of continuous forms different in width from each other, such as, for example, continuous forms of 10 inches in width, 15 inches in width and so on. One of these continuous forms is suitably selected, depending upon the image information to be recorded.

In the above-described image recording apparatus utilizing the electrophotographic system, a guide mechanism is arranged along a transport path of the continuous form or the like serving as a recording medium, for guiding the continuous form along the transport path. When a recording medium is the continuous form, the guide mechanism generally comprises a pair of endless tractor belts which are arranged parallel to each other along the transport path. Each of the tractor belts is formed with a plurality of projections which are arranged along the tractor belt and which are engageable with sprocket holes provides along a corresponding one of the opposite side edge portions of the continuous form. The continuous form is guided so as to travel along the predetermined transport path, with the projections on the respective tractor belts fitted in the sprocket holes in the respective side edge portions of the continuous form. When the continuous form is replaced by another one having a different width, both tractor belts are moved either towards or away from each other in accordance with the width of the new continuous form, such that the projections on the tractor belts are engaged with the sprocket holes in the respective side edge portions of the new continuous form.

Generally, however, since both tractor belts of the guide mechanism are moved toward and away from each other widthwise of the continuous form by respective distances equal to each other, the position of the continuous form along the transport path, that is, both the widthwise side edge positions of the continuous form associated with the printing start-up and termination positions vary because of replacement of the continuous form by another one having a different width. Accordingly, unless the moving amount of each of the tractor belts is known, the widthwise printing start-up timing shifts with respect to the new continuous form which has the different width, so that printing cannot regularly or correctly be effected widthwise for the continous form.

SUMMARY OF THE INVENTION

It is therefore an object of this invention to provide an improved printer that is capable of automatically detecting widthwise positions of opposite side edges of a continuous form along a predetermined transport path, by another one having a different width. So as to control the image recoridng timing such that an image can be correctly recorded onto the continuous form.

For the above purpose, according to the invention, there is provided a printer for printing image information onto a recording medium, which comprises:

guide means for guiding opposite side edges of a recording medium to enable the same to travel along a predetermined path, the guide means being movable widthwise of the recording medium in accordance with a width of the same;

position detecting means interlocked with the guide means, for detecting a position of the guide means widthwise of the recording medium to generate a position signal that is reprsentative of the position of the guide means; and delay means operative in response to the position signal from the detecting means, for delaying timing, widthwise of the recording medium, at which the image information is recorded onto the recording medium, thereby regulating a printing start-up position on the recording medium.

As described above, the arrangement of the printer according to the invention is such that the position signal outputted from the position detecting means corresponds to widthwise positions of the opposite side edges of the recording medium, and the image recording timing is controlled on the basis of the position signal. With such as arrangement, the image can be recorded onto the recording medium regularly widthwise of the same, even if the recording medium is replaced by another one having a different width.

BRIEF DESCRIPTION OF THE ACCOMPANYING DRAWINGS

DESCRIPTION OF THE EMBODIMENTS

Figure 1:
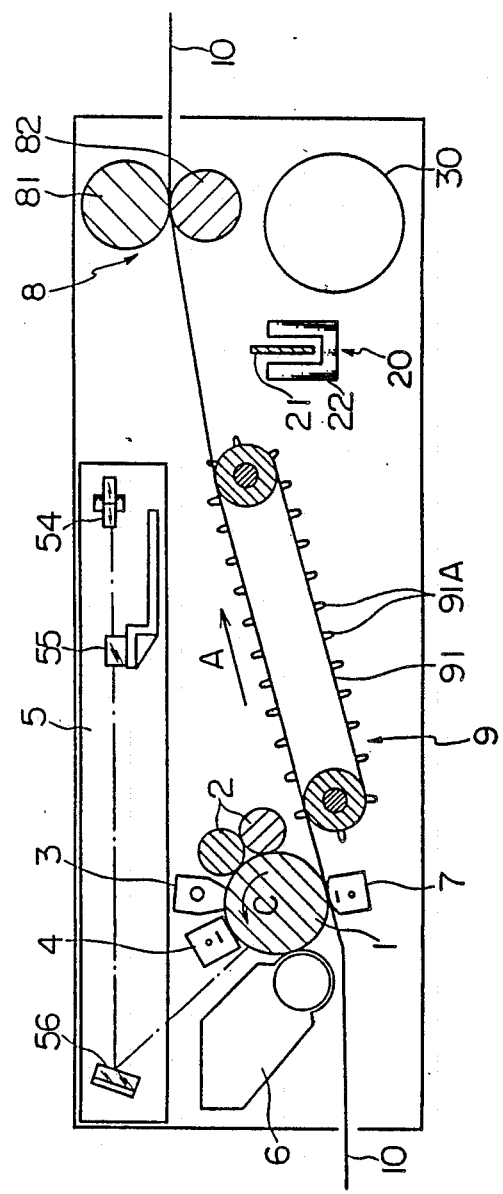
FIG. 1 is a somewhat scehmatic constructional side elevational view of a preferred embodiment of the invention in which a laser printer has incorporated therein a system for regulating a printing start-up position on a recording medium.
Figure 2:
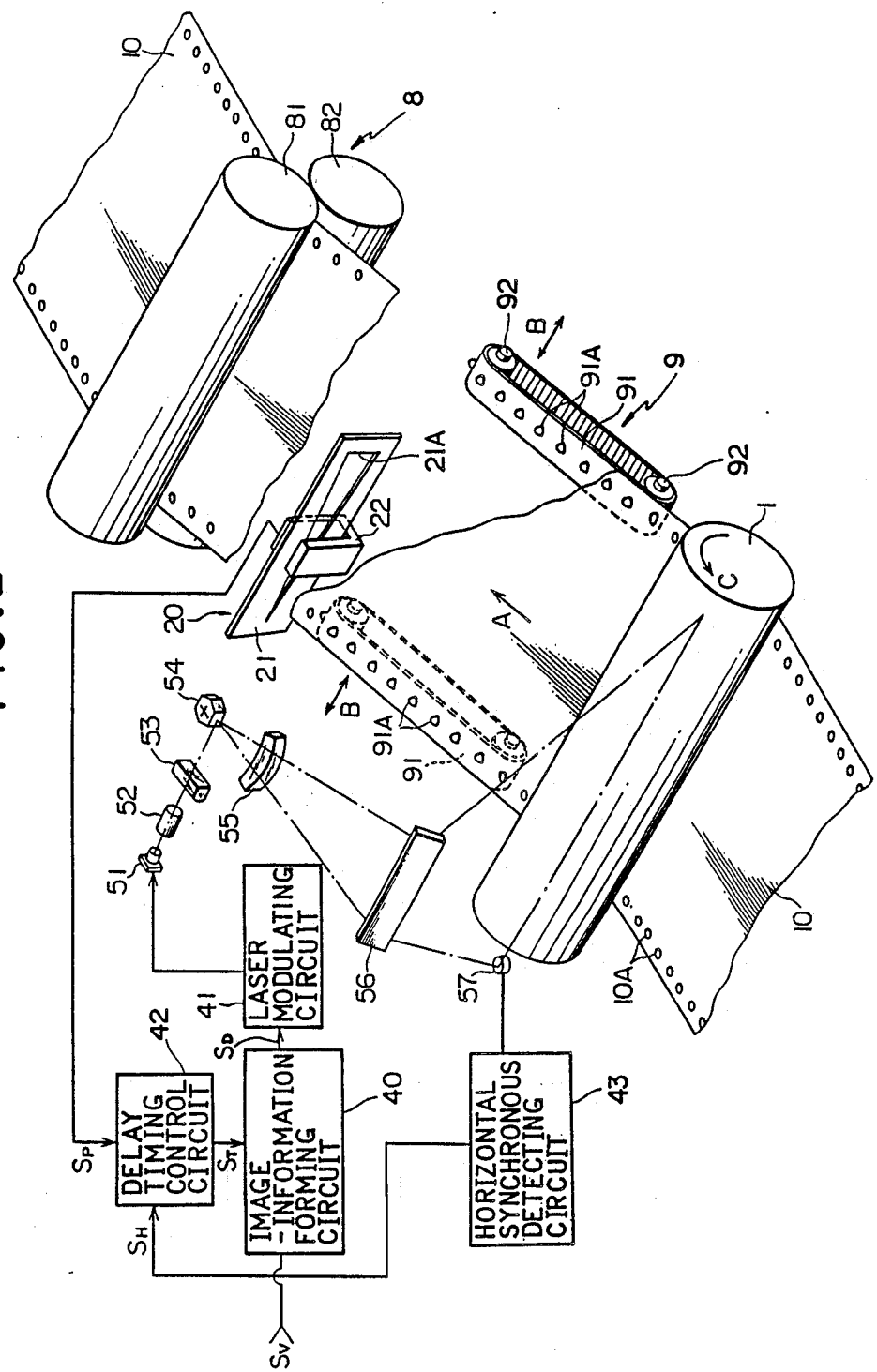
FIG. 2 is a perspective view and block diagram that diagrammatically shows a transport system and an image-signal processing system of the laser printer illustrated in FIG. 1.

Referring to FIGS. 1 and 2, there is illustrated a laser printer embodying the invention, in which a fan-folded form 10 is used as a recording medium. The laser printer is so designed as to print out inputted image information or an image-information signal $S_V$ from a host computer or the like, onto the fan-folded form 10 by means of an electrophotographic system.

The laser printer comprises a photoconductive drum 1. Arranged about the photoconductive drum 1 in due order in a rotational direction thereof indicated by an arrow C in FIG. 1 are toner-cleaning station 2, a decharging station 3, a charging station 4, an optical scanning system 5 for directing a laser beam that is modulated on the basis of the inputted image information to the photoconductive drum 1, a developing station 6, and a transfer station 7. A fixing station 8 is arranged downstream of the photoconductive drum 1 with reference to the traveling direction in which the fan-folded form 10 travels along a predetermined transport path. A guide mechanism 9 is arranged along the predetermined path and at a location that is between the photoconductive drum 1 and the fixing station 8, for guiding the opposite side edges of the fan-folded form 10. A position detecting mechanism 20 is arranged between the guide mechanism 9 and the fixing station 8 and below the fan-folded form 10 traveling along the predetermined transport path.

The arrangement is such that the laser beam from the optical scanning system 5 scans the charged surface of the drum 1 along an axis thereof to carry out a main scanning. As the drum 1 rotates, the charged surface thereof is also scanned in a direction opposite to the rotational direction of the drum 1, so that an auxiliary scanning is carried out. Thus, a latent image corresponding to the inputted image information is formed on the charged drum surface. Toner is then applied at the developing station 6 to the latent image to develop the same. Subsequently, the developed toner image is transferred at the transferring station 7 onto the fan-folded form 10. The transferred toner image on the fan-folded form 10 is fixed at the fixing station 8. The fan-folded form 10 having carried thereon the fixed image is discharged out of the laser printer.

At the fixing station 8, a fixing roller pair is arranged which is composed of a heat roller and backup roller, 81 and 82, having their respective axes extending perpendicularly to the traveling direction of the fan-folded form 10. A gap defined between outer peripheral surfaces of the respective follers 81 and 82 of the fixing roller pair is so set that when the fan-folded form 10 is clamped between the roller 81 and 82, the fan-folded form 10 is pressurized with a predetermined pressure.

The upper heat roller 81 is free to rotate, and a heat source such as a halogen lamp or the like is incorporated in the roller 81 to heat the same to a predetermined temperature. On the other hand, the lower backup roller 82 is drivingly connected to a drive motor 30 through a chain (not shown). The lower backup roller 82 is rotatively driven by the drive motor 30 in synchronism with the peripheral speed of the photoconductive drum 1. Thus, the fan-folded form 10 having carried thereon an unfixed image and transported to the fixing station 8 is clamped between the upper and lower rollers 81 and 82 and is pressurized by the same while being heated by the heat roller 81, so that the toner image is fused and fixed onto the fan-folded form 10.

The backup roller 82, driven to rotate by the drive motor 30, causes the fan-folded form 10 to travel along the predetermined path, to discharge the fan-folded form 10 having carried thereon the fixed image, out of the laser printer. In this manner, the pair of rollers 81 and 82 cooperatae with each other to serve also as a transport mechanism for the fan-folded form 10.

The drive motor 30 is employed not only to drive the backup roller 82, but also to serve as a drive source for other mechanisms associated with transportation of the fan-folded form 10, such as rotation of the photoconductive drum 1 and so on. Accordingly, the transport velocity of the fan-folded form 10 can be controlled on the basis of control of rotation of the drive motor 30.

Figure 3:
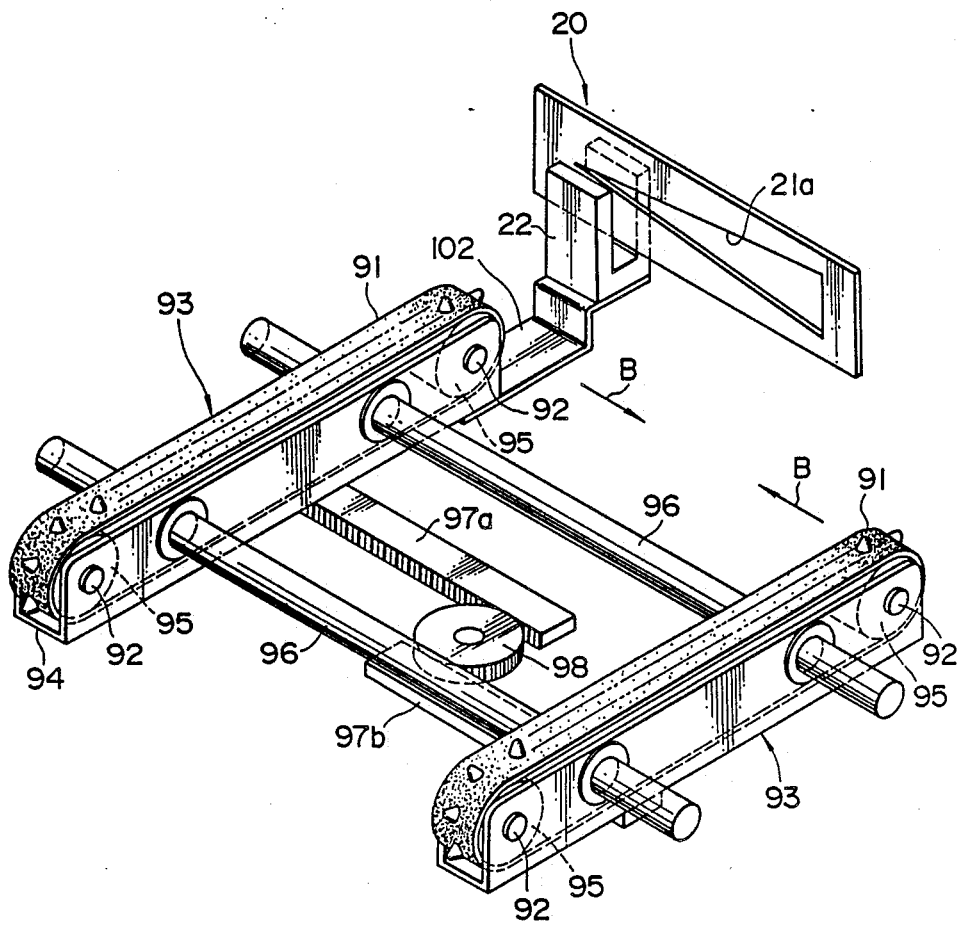
FIG. 3 is a perspective view of an arrangement for moving a pair of tractor units toward and away from each other.

The guide mechanism 9 comprises a pair of tractor units 93 and 93 serving as a pair of guide units (see FIG. 3). The tractor units 93 and 93 have respective endless tractor belts 91 and 91 which are arranged respectively below the opposite side edge portions of the fan-folded form 10 traveling from the transfer station 7 toward the fixing station 8 along the predetermined transport path. The tractor belts 91 and 91 extend parallel to the traveling direction and are so arranged as to have their respective upper runs coinciding with the transport path of the fan-folded form 10. Each of the tractor belts 91 is provided on an outer peripheral surface with a plurality of projections 91A which are arranged in a single row along the entire periphery of the tractor belt 91. The projections 91A on each tractor belt 91 are spaced from each other at intervals of ½ inch, equal to sprocket holes 10A formed along a corresponding one of the opposite side edge portions of the fan-folded form 10, so that the projections 91A are engageable with the sprocket holes 10A as shown in FIG. 2. Thus, the tractor belts 91 and 91 can be driven to run following transportation of the fan-folded form 10 driven to travel by the fixing station 8 in the direction indicated by an arrow A. Each of the tractor belts 91 is so designed as to have a predetermined traveling resistance and, accordingly, the tractor belts 91 and 91 serve to apply a tension to a portion of the fan-folded form 10 extending between the guide mechansim 9 and the fixing station 8 to prevent skewing and meandering of the fan-folded form 10. Thus, the pair of tractor belts 91 and 91 also serve to automatically restore the fan-folded form 10 to the regular position even if such skewing and meandering occur.

As shown in FIG. 3, each of the pair of tractor units 93 and 93 has a frame 94, a pair of spaced rollers 95 and 95 about which the endless belt 91 extends and passes, and a pair of spaced shafts 92 and 92 on which the pair of rollers 95 and 95 are rotatably mounted respectively and which extend perpendicularly to the predetermined transport path of the fan-folded form 10. A pair of spaced guide bars 96 and 96 extend perpendicularly to the predetermined transport path of the fan-folded form 10. The pair of tractor units 93 and 93 are mounted on the guide bars 96 and 96 for sliding movement therealong towards and away from each other in a direction indicatead by the arrows B. Further, a rack member 97a is fixedly mounted to the bottom of the frame 94 of one of the pair of tractor units 93, and extends toward the other tractor unit 93. Also, a rack member 97b is fixedly mounted to the bottom of the frame 94 of the other tractor unit 93, and extends toward the other tractor unit 93 is spaced parallel relation to the rack plate 97a. A pinion 98 is arranged between the pair of rack members 97a and 97b in meshing relation to their rack teeth. Thus, when one of the pair of tracator units 93 and 93 is slid along the guide bars 96 and 96, the pinion 98 is rotated by one of the rack members 97a and 97b, and the other one of the rack membrs 97a and 97b is moved in an opposite direction. Thus, the pair of tractor units 93 and 93, (that is, the pair of tractor belts 91 and 91) are so moved as to be capable of guiding the sprocket holes 10A formed in the opposite side edge portions of the fan-folded form 10, in accordance with the replacement of the fan-folded form 10 by another one having a different width.

The aforesaid position detecting mechanism 20 comprises an enlongated slit plate 21, serving as an elongated variable element arranged widthwise of the fan-folded form 10, and a photo-coupler 22 serving as a movable element having a light source and a light-receiving element. The light source and the light-receiving element of the photo-coupler 22 are opposed to each other, but are spaced a predetermined distance from each other. The slit plate 21 has formed therein a wedge-like slit 21a which extends longitudinally of the slit plate 21. The photo-coupler 22 is so arranged that the light source and the light-receiving element are opposed to each other through the slit 21a. The photo-coupler 22 is connected to the bottom of the frame 94 of one of the pair of tractor units 93 through a bracket 102 in such a manner that the photo-coupler 22 is movable in interlocked relation to the pair of tractor units 93 and 93.

In the position detecting mechanism 20 of the illustrated embodiment, the slit 21a in the slit plate 21 serves as a shield between the light source and the light-receiving element of the photo-coupler 20. Accordingly, a signal $S_P$ representing of a voltage level relying upon the shield, is outputted from the light-receiving element of the photo-coupler 22. Since the slit 21a is in the form of an elongated wedge extending longitudinally of the slit plate 21, the amount of light shielding a light quantity between the light source and the light-receiving element of the photo-coupler 22 varies, depending upon the movement of the tractor units 93 and 93 widthwise of the fan-folded form 10, so that the signal $S_P$ outputted from the light-receiving element of the photo-coupler 22 is brought to a position signal relying upon the movement of the tractor units 93 and 93. That is moving the position of the tractor units 93 and 93 varies the amount of light that is detected by the light receiving element of the photo-coupler 22, and hence the level of the signal $S_P$.

Image-information signal $S_V$ is inputted from a host computer, or the like, and is decoded by an image-information forming circuit 40 to produce modulating signal $S_D$ which is sent to a laser modulating circuit 41. The time, at which the modulating signal $S_D$ is sent to the laser modulating circuit 41 is synchronized with a timing signal $S_T$ outputted from a delay timing control circuit 42. The laser modulating circuit 41 controls emission of a laser beam from a semiconductor laser 51, on the basis of the modulating signal $S_D$. Thus, the laser beam emitted from the semiconductor laser 51 is modulated on the basis the image information.

The laser beam emitted from the semiconductor laser 51 passes through a collimator lens 52, a beam-shaping unit 53, a polygonal mirror 54 and an f0 lens 55. The laser beam is then reflected by a reflecting mirror 56 to scan the charged surface of the photoconductive drum 1, thereby effecting the main scanning. A beam detector 57 is arranged at a location spaced a predetermined distance away from one end face of the photoconductive drum 1. The beam detector 57 is connected to a horizontal synchronous detecting circuit 43 in such a manner that a horizontal synchronous signal $S_H$ is sent from the circuit 43 to the delay timing control circuit 42 each time the laser beam passes by the beam detector 57.

Inputted to the delay timing control circuit 42 is the horizontal synchronous signal $S_H$ as well as the positional signal $S_P$ from the photo-coupler 22, which indicates the position of each tractor unit 93. On the basis of the horizontal synchronous signal $S_H$ and the positional signal $S_P$, the delay timing control circuit 42 generates a timing signal $S_T$ sent to the image-information forming circuit 40 is brought to a signal generated at a time that is delayed by a predetermined perios of time from the issuance of the horizontal synchronous signal $S_H$, which is indicative of the main scanning of the laser beam, in other words, from the detection of the laser beam by the beam detector 57. The predetermined delay period of time increases and decreases in proportion to the signal level of the position signal $S_P$ which is indicative of the position of each tractor unit 93, which is sent from the photo-coupler 22 to the delay timing control circuit 42.

With the arrangement described above, the position signal $S_P$ outputted from the position detecting mechanism 20 indicates a position of each widthwise side edge of the fan-folded form 10. Operational timing of the image-information forming circuit 40, that is, the sending timing of the modulating signal $S_D$ to the laser modulating circuit 41 is synchronized with the timing signal $S_T$ based on the position signal $S_T$. Thus, even if the fan-folded form 10 is replacaed by another one having a different width, the image can be recorded onto the fan-folded form having the different width, regularly widthwise of the fan-folded form.

The embodiment has been described as having the position detecting mechanism 20 which is composed of the slit plate 21 and the photo-coupler 22. It is to be understood, however, that the invention is not limited to this specific embodiment, but the position detecting mechanism may suitably be modified. For example, the position detecting mechanism may includes an elongated linear resistor arranged widthwise of the fan-folded form 10, and a slider interlocked with the pair of endless tractor units 93 and 93 for sliding movement along the linear resistor. Further, if the fan-folded form 10 is replaced only by another one predetermined in width, such as a fan-folded form of 10 inches in width or a fan-folded form of 15 inches in width, a plurality of microswitches or the like may be employed in place of the illustrated position detecting mechanism 20. That is, the plurality of microswitches are arranged respectively at locations corresponding to the widths of the fan-folded forms. Any one of the microswitches is turned on by movement of the pair of tractor units 93 and 93 to the position corresponding to the microswitch attendant upon the replacement of the fan-folded form 10 by another one.

Furthermore, the embodiment has been described as having the pair of tractor belts 91 and 91 which utilize the sprocket holes 10A in the fan-folded form 10 to guide the same along the predetermined transport path. If cut sheets having no sprocket holes are used as the recording medium, however, a roller arrangement may be employed as the guide mechanism. That is, the roller arrangement comprises two pairs of rollers arranged respectively at widthwise side edges of the cut sheet such that only the side edge portions of the cut sheet are clamped respectively by the two pairs of rollers and are guided by the same. In this case, the position detecting mechanism should be so arranged as to be interlocked with the two pairs of the rollers which are movable toward and away from each other in accordance with the width of the cut sheet, to output a position signal indicative of a position of the one pair of rollers.

Moreover, it will be appreciated by one skilled in the art that, in FIG. 3, the rack plate 97b may be dispensed with such that only the tractor unit 93, to which the photo-coupler 22 is connected through the bracket 102, is movable toward and away from the other tractor unit 93 which is immovable. Further, in case the cut sheets are employed, it is desirable to connect a reversible motor to the shaft of the pinion 98 through a reducing gear train, so as to automatically move the tractor units 93 and 93.

What is claimed is:

1. A printer for printing image information onto a recording medium, which comprises:
    means for guiding opposite side edges of said recording medium to enable said recording medium to travel along a predetermined path, said guide means being movable widthwise of said recording medium in accordance with a width of said recording medium;
    detecting means interlocked with said guide means for detecting a position of said guide means widthwise of said recording medium to generate a position signal that is representative of the position of said guide means; and
    delay means operative in response to said position signal from said detecting means for delaying a timing signal, widthwise of the recording medium, at which said image information is recorded onto said recording medium, thereby regulating a printing start-up position on said recording medium.

2. The printer according to claim 1, wherein said guide means comprises a pair of opposed spaced guide units, at least one of which is movable widthwise towards and away from the other guide unit of said recording medium in accordance with the width of said recording medium, said position detecting means being interlocked with said movable guide unit.

3. The printer according to claim 2, wherein said guide units comprises endless tractor belts arranged along opposite side edges of said recording medium, each of said endless tractor belts being provided with a plurality of projections arranged along said endless tractor belt, said projections on each of said endless tractor belts being engageable with sprocket holes formed in a corresponding side edge portion of said recording medium.

4. The printer according to claim 2, which further comprises moving means associated with said pair of guide units of moving widthwise said guide units towards and away from each other, said moving means cmprising a pair of rack members fixedly mounted respectively to said pair of guide units, each of said pair of rack members being formed with rack teeth, and a pinion in mesh with said rack teeth of said pair of rack members, wherein rotation of said pinion causes said pair of rack members to move said pair of guide units towards and away from each other, said position detecting means being connected to one of said pair of guide units for movement together with said movable guide unit.

5. The printer according to claim 2, wherein said position detecting means comprises an elongated variable element fixedly arranged widthwise of said recording medium and a movable element interlocked with said guide members for movement along said elongated variable element, said movable element cooperating with said elongatead variable element to generate said position signal that is representative of a position of said movable element relative to said elongated variable element.

6. The printer according to claim 5, wherein said elongated variable element comprises an elongated slit plate formed therein with a wedge-like slit extending longitudinally of said elongated slit plate, said movable element comprising a photo-coupler that is movable along said wedge-like slit.

7. The printer according to claim 1, which further comprises:
    a rotatable photoconductive drum;
    laser means for emitting a laser beam to cause said laser beam to scan a charged peripheral surface of said drum, thereby forming a latent image thereon which corresponds to said image information;
    means for developing said latent image with toner to form a toner image on the surface of said drum;
    means for transferring said toner image from the surface of said drum onto said recording medium;
    means for fixing the transferred toner image on the recording medium;
    image-information forming means for decoding said image information to generate a modulating signal;
    laser-modulating means connected to said laser means and to said image-information forming means, for controlling the emission of said laser beam from said laser means on the basis of said modulating signal from said image-information forming means; and
    beam detecting means connected to said delay means, for detecting said laser beam scanning the charged surface of said drum so as to generate a horizontal synchronous signal,
    wherein said delay means is operative in response to said horizontal synchronous signal from said beam detecting means as well as said position signal from said positoin detecting means, for generating a timing signal, and
    wherein the timing at which said modulating signal is sent from said image-information forming means to said laser modulating means is synchronized with said timing signal from said delay means.

8. The printer according to claim 7, wherein said beam detecting means includes a beam detector arranged in spaced relation to an end face of said photoconductive drum for generating a signal each time said laser beam from said laser means passes by said beam detector and horizontal synchronous detecting means connected to said beam detector and to said delay means, said horizontal synchronous detecting means being operative in response to said signal from said beam detector to generatea said horizontal synchronous signal.

* * * * *

UNITED STATES PATENT AND TRADEMARK OFFICE
CERTIFICATE OF CORRECTION

PATENT NO. : 4,897,675

DATED : Jan. 30, 1990

INVENTOR(S) : K. NEGESHI

It is certified that error appears in the above-identified patent and that said Letters Patent is hereby corrected as shown below:

column 1, line 20, change "printer" to ---in printers---;

column 1, line 33, insert ---to--- before "be";
column 1, line 35, insert ---which are--- after "forms";
column 1, line 45, change "a" to ---the--- after "when";
column 1, line 45, change "the" to ---a--- after "is";
column 1, line 51, change "provides" to ---provided---;
column 1, line 66, change "toward" to ---towards---;
column 2, line 19, change "width. So" to ---width, so---;

column 2, line 20, change "recoridng" to ---recording---;

column 2, line 34, change "reprsentative" to ---representative---;
column 2, line 49, change "as" to ---an---:
column 2, line 57, change "scehmatic" to ---schematic---;

column 3, line 51, change "follers" to ---rollers---;
column 3, line 53, change "roller" to ---rollers---;
column 4, line 6, change "cooperatae" to ---cooperate---;

column 4, line 59, change "indicatead" to ---indicated---;

column 4, line 65, change "is" to ---in---;
column 4, line 68, change "tracator" to ---tractor---;
column 5, line 32, change "20" to ---22---;

UNITED STATES PATENT AND TRADEMARK OFFICE
CERTIFICATE OF CORRECTION

PATENT NO. : 4,897,675
DATED : Jan. 30, 1990
INVENTOR(S) : K. NEGISHI

It is certified that error appears in the above-identified patent and that said Letters Patent is hereby corrected as shown below:

column 5, line 33, change "representing of a" to ---, representing a---;
    column 5, line 44, insert ---,--- after "is";
    column 5, line 51, insert ---a--- before "modulating";
    column 5, line 63, "f0" to ---f$\theta$
    column 6, betweens lines 11 and 12, insert ---timing signal $S_T$ which is sent to the image-information forming circuit 40. That is to say, the ---;
    column 6, line 14, change "perios" to ---period---;
    column 6, line 30, change "$S_T$" to ---Sp--- (second occurrence);
    column 6, line 31, change "replacaed" to ---replaced---;
    column 6, line 41, change "includes" to ---include---;
    column 8, line 9, claim 5, line 7 change "elongatead" to ---elongated---;
    column 8, line 47, claim 7, change "positoin" to ---position---; and
    column 8, line 62, claim 8, line 10 change "generatea" to ---generate---.

Signed and Sealed this

Eighteenth Day of February, 1992

*Attest:*

HARRY F. MANBECK, JR.

*Attesting Officer*      *Commissioner of Patents and Trademarks*